US005533293A

United States Patent [19]
Boehm

[11] Patent Number: 5,533,293
[45] Date of Patent: Jul. 9, 1996

[54] FISH LANDING NET WITH TELESCOPING HANDLE

[76] Inventor: George L. Boehm, 17990 N. 88th Ave., Peoria, Ariz. 84382

[21] Appl. No.: 490,493

[22] Filed: Jun. 14, 1995

Related U.S. Application Data

[63] Continuation-in-part of Ser. No. 364,821, Dec. 27, 1994, abandoned.

[51] Int. Cl.⁶ ................................................. A01K 77/00
[52] U.S. Cl. ................................................................. 43/12
[58] Field of Search ..................................................... 43/12

[56] References Cited

U.S. PATENT DOCUMENTS

| | | |
|---|---|---|
| 317,820 | 3/1885 | McClintock . |
| 412,773 | 10/1889 | Meisselbach . |
| 844,594 | 2/1907 | Haskell . |
| 1,243,153 | 10/1917 | Gabler . |
| 1,450,322 | 4/1923 | McElhany . |
| 1,490,048 | 4/1924 | Voelker . |
| 1,524,957 | 2/1925 | Sundberg . |
| 1,541,674 | 6/1925 | Wever . |
| 2,202,789 | 5/1940 | Benson .................. 43/12 |
| 2,205,229 | 6/1940 | Spriggs et al. .......... 43/12 |
| 2,515,685 | 7/1950 | Ash ......................... 43/12 |
| 2,683,321 | 7/1954 | Faber ...................... 43/12 |
| 2,688,815 | 9/1954 | Phillips ................... 43/12 |
| 2,800,737 | 7/1957 | Crossan .................. 43/12 |
| 4,138,790 | 2/1979 | Schmucker .............. 43/12 |
| 4,492,052 | 1/1985 | Davis ....................... 43/12 |
| 4,706,404 | 11/1987 | Kun ......................... 43/12 |
| 4,870,773 | 10/1989 | Schmucker et al. ..... 43/12 |
| 4,881,776 | 11/1989 | Wang ....................... 279/379 |
| 4,934,025 | 6/1990 | Mariol ..................... 16/347 |
| 5,123,768 | 6/1992 | Franklin .................. 403/96 |
| 5,217,315 | 6/1993 | Rosane .................... 403/102 |
| 5,339,556 | 8/1994 | Boehm ..................... 43/11 |

*Primary Examiner*—Kurt Rowan
*Assistant Examiner*—Darren W. Ark
*Attorney, Agent, or Firm*—Jansson & Shupe, Ltd.

[57] ABSTRACT

The disclosed fish landing net includes a telescoping handle movable with respect to two handle-engaging "mirror image" lock pieces, each of which has a pair of interior grooves. When the net is in use or when the handle is being telescoped toward the distal portion, each groove of each lock piece is in registry with the corresponding groove of the other lock piece. Axial ridges on the handle engage respective pairs of grooves and prevent relative rotating movement between the handle and the lock pieces. A release portion at the outer end of the handle permits the lock pieces to be rotated with respect to such handle when the net is being folded or unfolded. The net also includes a locking member preventing telescoping handle movement when the net is erected ready for use.

19 Claims, 7 Drawing Sheets

FISH LANDING NET WITH TELESCOPING HANDLE

Related Application

This application is a continuation-in-part of application Ser. No. 08/364,821 filed on Dec. 27, 1994, and now abandoned.

FIELD OF THE INVENTION

This invention relates generally to fishing and, more particularly, to fish landing nets.

BACKGROUND OF THE INVENTION

Fishing is an activity having both commercial and sporting purposes. It is highly popular as an outdoor sport, largely because of the solitude (or companionship) and opportunity to enjoy natural scenic beauty which often attends such sport. Of course, the successful angler can look forward to a tasty meal.

And the sport has its economic aspects. Persons who enjoy fishing spend millions of dollars on fishing equipment. In some aspects of game fishing, e.g., lake fishing involving trolling or casting, participants go forth in boats laden with fishing gear of many types. Such gear may include heavy tackle boxes containing the latest lures, live bait containers, multiple fishing poles and, of course, a landing net. Persons who outfit themselves in this way and who engage in this type of game fishing find such activity practical only with a boat—there is no other good way to transport and use the gear.

While anglers often journey to a fishing site by motor vehicle, it is not uncommon to fly to a site near the body of water to be fished. And, of course, such air travellers know that it is desirable to minimize the weight and space needed for the fishing gear.

One of the potentially bulkiest but necessary items of equipment used by anglers is a landing net. In an effort to address the need for a compact yet effective net, folding landing nets have been made available. Such nets have varying degrees of complexity and ease of use. Folding landing nets are sold by Cabela's of Sidney, Nebr., by The Global Flyfisher of Northbrook, Ill., and by many others.

In the patent literature, examples of fish landing nets are shown in U.S. Pat. Nos. 2,515,685 (Ash); 317,820 (McClintock); 4,870,773 (Schmucker et al.); 1,430,221 (Dukas) and 4,492,025 (Davis). The nets shown in such literature employ parts detachable from one another so that the net can be folded or, at least, "shape-modified" in some way.

The net shown in the Schmucker et al. patent has flexible, curved arm-like members which telescope into rigid housing cylinders when the net is collapsed. The net has two spring-biased caps preventing the outer ends of the members from scissoring when the net is in use. Such caps must be manually, simultaneously pushed back (as the patent describes it) to permit such outer ends to come into registry during net setup. The caps are then released to hold such ends in that position.

While earlier landing nets have been generally satisfactory, many are characterized by certain disadvantages. One involves the fact that when folded for carrying, the user must contend with and keep track of several loose parts. The device shown in the Ash patent is a good example.

Loose parts are (or should be) anathema to anglers. This is so since anglers often unfold their nets directly over water or very near water. Assuming the angler is successful in getting all of the loose parts to the fishing site, inadvertent dropping and loss of a part may prevent effective landing of fish.

Yet another disadvantage of certain known folding landing nets is their complexity in construction, in use or both. The net shown in the Schmucker et al. patent is an example in its use of a relatively large number of parts, some telescoping, and the need for a degree of manual dexterity when setting up the net for use.

And not all known landing nets of the collapsible type have any sort of device for preventing collapse when the net is in use. The net shown in U.S. Pat. No. 4,138,790 (Schmucker) is an example. And while the net of the above-mentioned Schmucker et al. patent has a button extending into an opening for holding the handle in position during net use, such button does not have a positive-lock "ledge-like" face. A locking device is highly desirable, at least because the distal end of the net is often "jammed" into the water surface when landing a fish. The resulting force could collapse a net with an unsecured telescoping handle such as that of the noted Schmucker patent.

To the delight of anglers, especially those fly fishing in streams for trout, an imaginative new folding landing net fish is now available and is the subject of U.S. Pat. No. 5,339,556 (Boehm).

OBJECTS OF THE INVENTION

It is an object of the invention to provide an improved fish landing net overcoming some of the problems and shortcomings of prior art landing nets.

Another object of the invention is to provide an improved fish landing net wherein all of the parts are (or may be) attached together when the net is folded for transport as well as when the net is in use.

Another object of the invention is to provide an improved fish landing net which reduces the number of parts required.

Yet another object of the invention is to provide an improved fish landing net which requires very little manual dexterity to set the net up for use or fold it for travel.

Another object of the invention is to provide an improved fish landing net which incorporates a positive-locking feature. How these and other objects are accomplished will become more apparent from the following detailed description and the drawing.

SUMMARY OF THE INVENTION

The inventor of the invention of U.S. Pat. No. 5,339,556 is also the inventor of the fish landing net disclosed in this specification. This specification describes another approach for providing a landing net which is sufficiently robust to land large game fish such as Northern pike or lake trout and yet collapses and folds to a relatively small size.

The invention is a fish landing net of the type including a distal portion away from and a proximal portion nearer the angler when the net is in use. The net has a pair of frame members joined at the distal portion by a flexible connector for ease in folding. A handle is at the proximal portion.

The handle moves "telescope-like" along an axis extending toward the proximal and distal portions. The handle is telescoped inward toward the distal portion to fold the net and telescoped away from the distal portion to erect the net for use.

More specifically, the proximal portion includes first and second lock pieces, each of which substantially circumscribes the axis along which the handle moves. Such lock pieces support the handle for telescoping movement.

Each lock piece has at least one surface deformation (and preferably has first and second deformations) which in one specific embodiment are first and second axial grooves along the interiors of such pieces. The handle has a third surface deformation, e.g., a ridge or a pair of ridges, extending axially along such handle and when the net is erected for use, the third surface deformation engages the first and second surface deformations. Such engagement "locks up" the net by substantially preventing relative rotating movement of the handle and the lock pieces with respect to one another.

In another aspect of the invention, the handle has an outward end away from the net distal portion. Such outward end includes a release portion free of the third surface deformation. In the absence of such deformation (and when the lock pieces and the release portion are coincident with one another), the lock pieces and the handle can be relatively pivoted about the axis. The release portion is preferably at the handle outward end so that when the net is folded, the handle does not obstructively "stick out" away from the net frame. Space is thereby saved.

In yet another aspect of the invention, the first lock piece includes a stop member and the second lock piece includes a stop surface in contact with the stop member when the net is erected for use. In a highly preferred embodiment, each lock piece has a stop member and a stop surface. When the net is unfolded ready for use, the stop member of the first lock piece contacts the stop surface of the second lock piece. Similarly, the stop member of the second lock piece contacts the stop surface of the first lock piece.

And there are yet additional new features. The lock pieces are configured so that they are relatively axially immovable one with respect to the other. To that end, at least one lock piece has a circumferentially-extending land engaging a groove in the other lock piece. Most preferably, each lock piece redundantly has such a land and groove.

In a preferred embodiment, the handle and the lock pieces retentively engage one another so that whether folded for storage or travel or unfolded for use, the handle does not separate from the other components of the net and, particularly, from the lock pieces. To that end, the handle has a disc-like shoulder at its inward end for engaging the proximal portion of the net, i.e., one of the two lock pieces, thereby preventing the handle from separating from such proximal portion while the net is in use.

And, most preferably, there is a second shoulder at the outward end which engages such proximal portion when the handle is telescoped inward and the net is folded or ready to be folded. Such second shoulder prevents the handle from separating from such proximal portion when the net is folded. For ease of assembly, it is preferred that one of the shoulders, e.g., that at the outward end of the handle, be removable to permit the handle to be telescopically assembled to and disassembled from the lock pieces.

A preferred embodiment of the new landing net also includes another highly-desirable feature. There is a locking member between the handle distal and proximal ends to prevent movement of the handle along the long handle axis when the net is erected for use. In a more specific embodiment, the locking member engages one of the locking pieces described above.

The locking member can be configured in any of several different embodiments. In a highly preferred embodiment (appropriate when the handle is made of or at least includes a plastic material having shape memory), a notch is cut along the handle to form the locking member which, therefore, also includes the plastic material. To put it in other words, the handle plastic material is the "parent" material and the locking member is formed by cutting such parent material.

When so formed, the parent material of the handle and the material of the locking member is continuous. That is, there is no discontinuity or joint between such member and the handle.

However, that is not the only way that a locking member can be provided. As another example, the locking member includes a spring-biased button that has a positive-lock face. Such button "pops up" when the handle is moved to its fully-extended position.

Further details of the invention are set forth in the following detailed description and in the drawing.

DETAILED DESCRIPTION OF PREFERRED EMBODIMENTS

Figure 1:
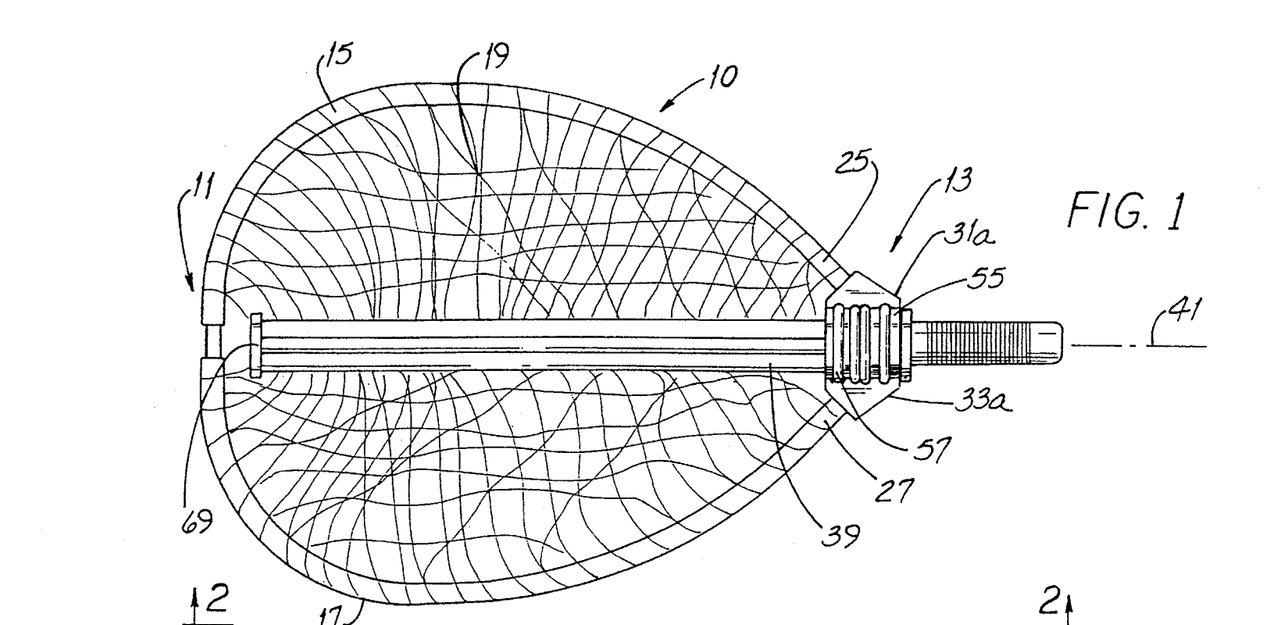
FIG. 1 is a top plan view of one embodiment of the inventive net shown with the handle telescoped inward as when the net is being folded or unfolded.
Figure 2:
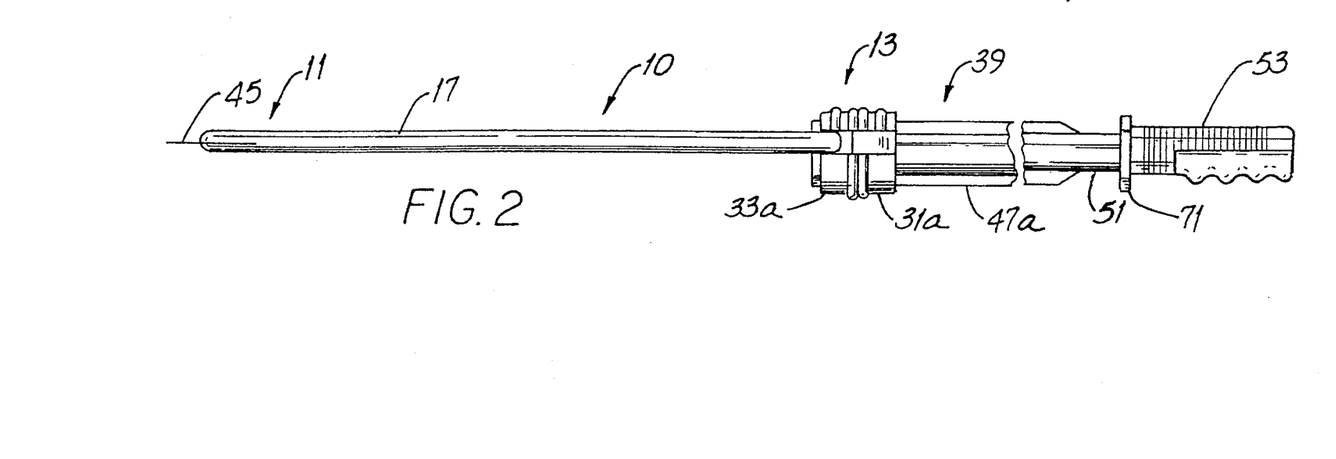
FIG. 2 is, generally, a side elevation view of the net of FIG. 1 taken along the viewing plane 2—2 thereof. The handle is telescoped outward as when the net is erected for use. Parts are broken away and the netting is omitted.
Figure 3:
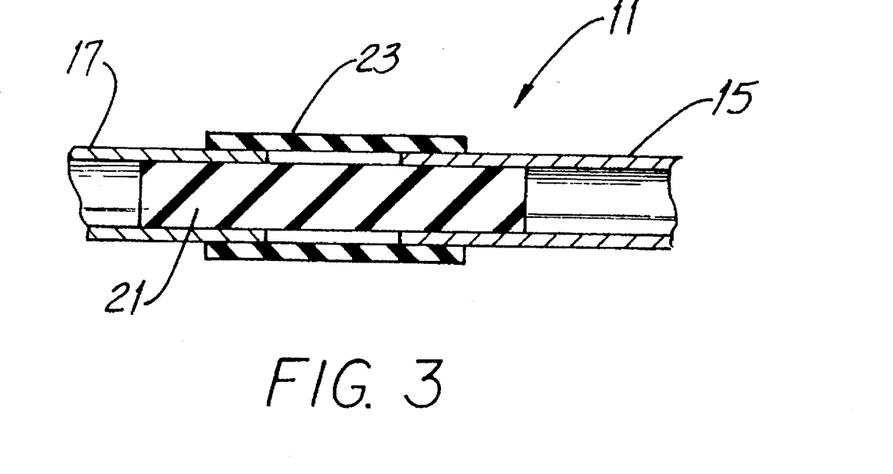
FIG. 3 is a cross-sectional view of the distal portion of the net showing how the frame members are fitted with a flexible connector.

A general overview description of the new net 10 will be provided and this is followed by a detailed description of the various components used in the net 10. Referring first to FIGS. 1, 2 and 3, the new fish landing net 10 has a distal portion 11 away from and a proximal portion 13 nearer the angler when the net 10 is in use. A pair of rigid, tube-like frame members 15, 17 are threaded through the mesh netting 19 and such members 15, 17 are joined at the distal portion by a flexible connector 21 for ease in folding. The connector 21 is preferably an elastomer with "shape memory." That is, in the absence of outside forces, e.g., a force folding the net 10 for storage, the connector 21 is straight. A jacket 23 overcovering the connector 21 or used in lieu of the connector 21 may optionally be used.

Figure 4:
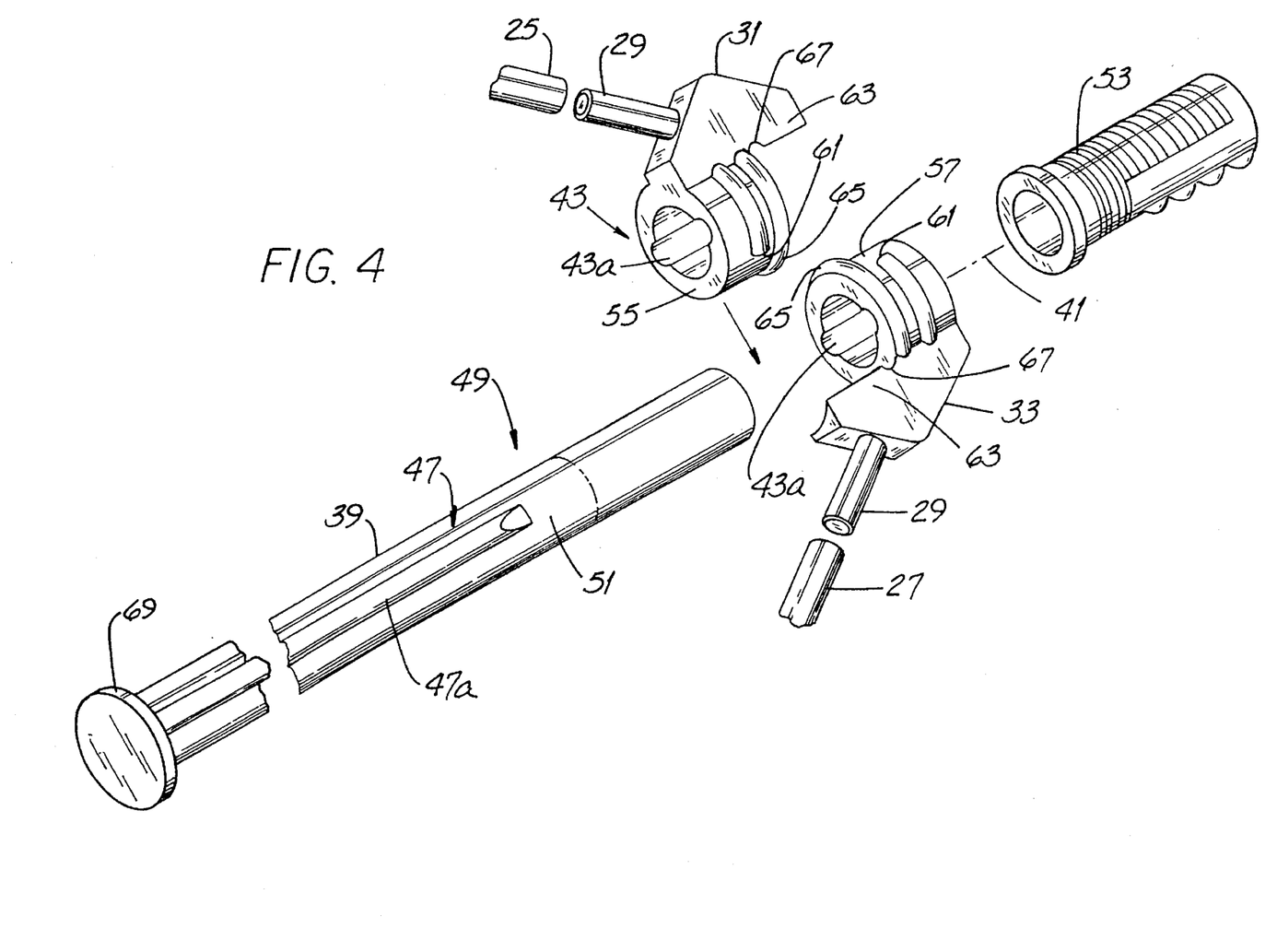
FIG. 4 is an exploded view of components of a second embodiment of the new net. Parts are broken away and other parts are omitted.
Figure 5:
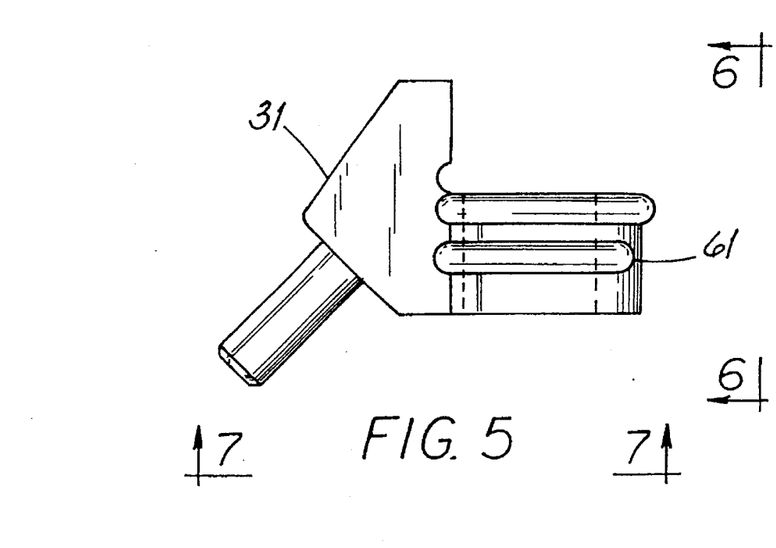
FIG. 5 is a top plan view of one of the ring-like lock pieces shown in FIG. 4.
Figure 6:
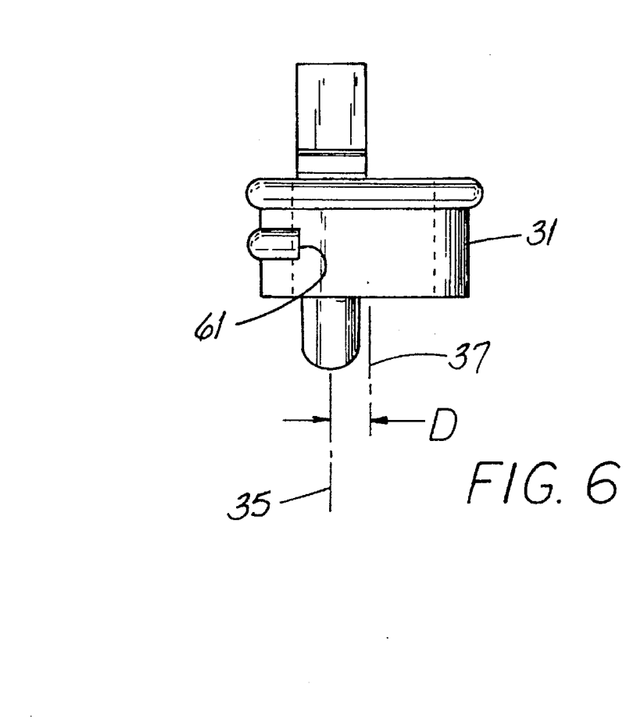
FIG. 6 is a side view of the lock piece shown in FIG. 5 taken generally along the viewing plane 6—6 thereof.
Figure 7:
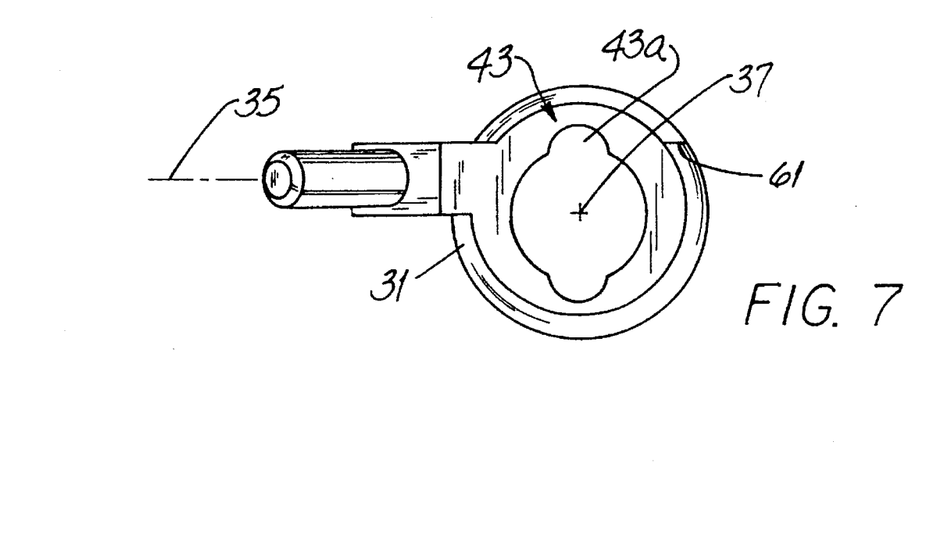
FIG. 7 is an end view of the lock piece shown in FIG. 5 taken generally along the viewing plane 7—7 thereof.
Figure 8:
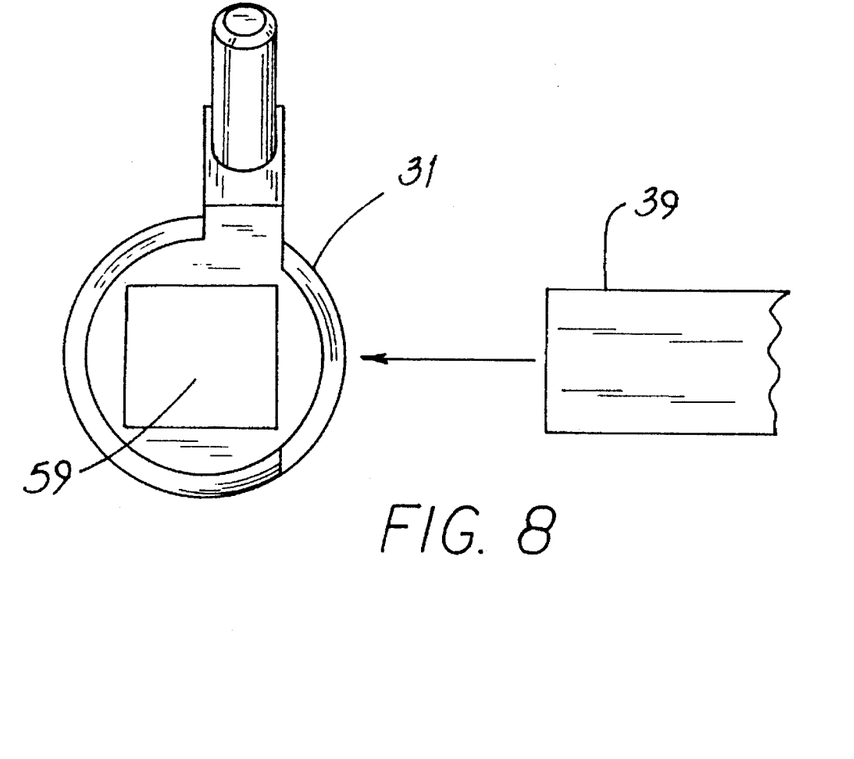
FIG. 8 is a representative view showing how a square handle and lock pieces having conformably-shaped square openings may be used to make the net of FIG. 1.
Figure 9:
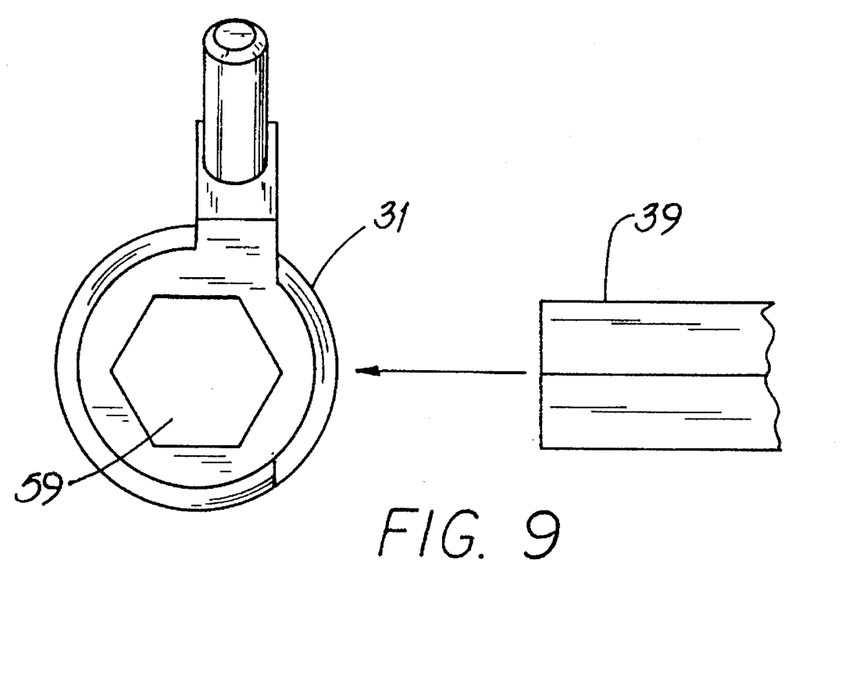
FIG. 9 is a representative view showing how a hexagon handle and lock pieces having conformably-shaped hexagon openings may be used to make the net of FIG. 1.
Figure 10:
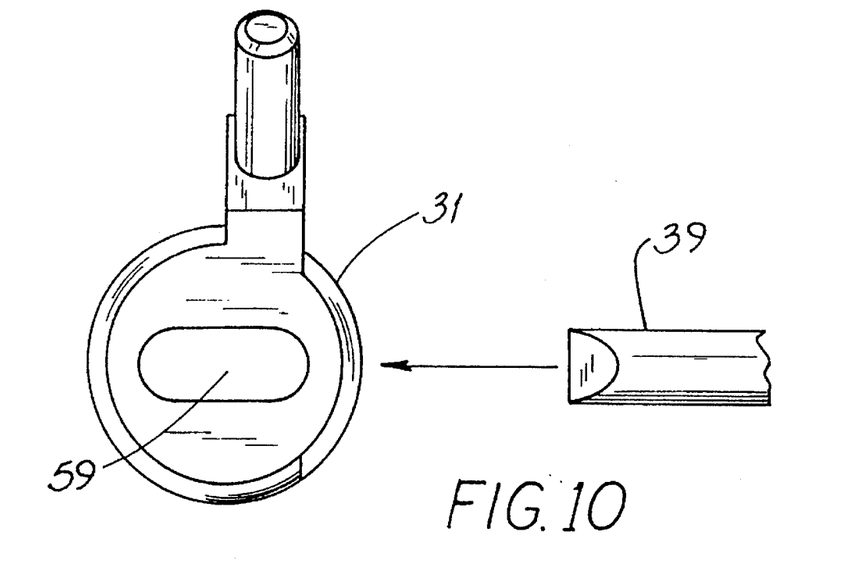
FIG. 10 is a representative view showing how an oval handle and lock pieces having conformably-shaped oval openings may be used to make the net of FIG. 1.
Figure 11:
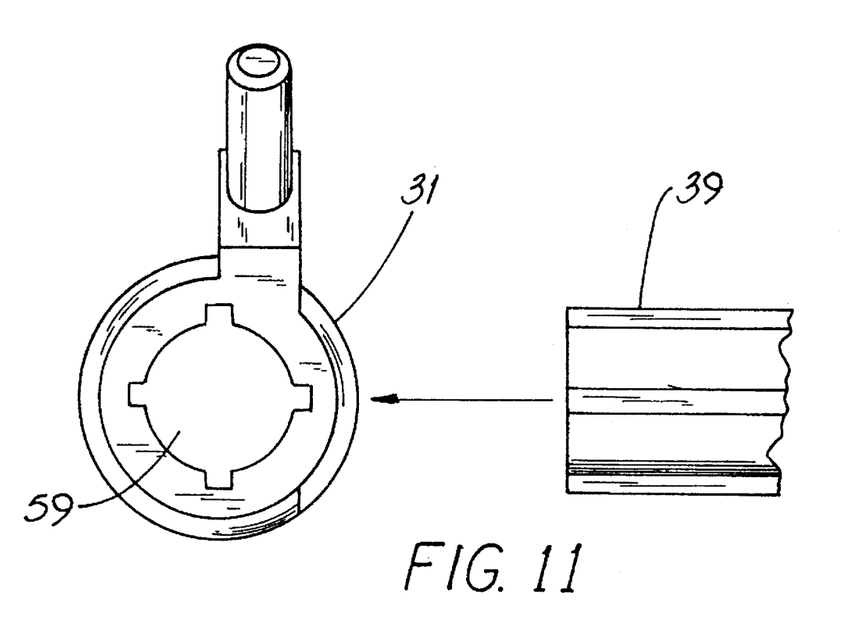
FIG. 11 is a representative view showing how a splined handle and lock pieces having conformably-shaped splined openings may be used to make the net of FIG. 1.

Referring also to FIG. 4, each proximal end 25, 27 of each frame member 15, 17, respectively, is fitted to a stud 29 projecting from each of the first and second lock pieces 31 and 33, respectively. Each proximal end 25, 27 is substantially permanently attached to a respective lock piece 31, 33. As will be seen, detachment of a proximal end from its stud is not necessary when folding the net 10. It is to be noted from an inspection of FIGS. 6 and 7 that in a highly preferred embodiment, the centerline 35 of a stud 29 is angular to and offset from the centerline 37 of a respective lock piece. Such offset is by a dimension D about equal to one-half the maximum cross-sectional dimension (the diameter if tubing is used) of the frame member 15 or 17.

A handle 39 is at the proximal portion 13 and such handle 39 moves "telescope-like" along an axis 41 extending toward the distal and proximal portions 11, 13. The handle 39, preferably hollow, is telescoped inward toward the distal portion 11 to fold the net 10 and telescoped away from the distal portion 11 to erect the net 10 for use.

The proximal portion 13 includes first and second lock pieces 31, 33, respectively, through which the handle 39 slides. In a highly preferred embodiment, each lock piece 31, 33 circumscribes the axis 41 along which the handle 39 moves and support the handle 39 for telescoping movement. In general terms, the lock pieces 31, 33 each have a surface deformation 43 (or first and second deformations 43), e.g., one or two grooves 43a. When the net 10 is assembled for use, the groove(s) 43a of one-lock piece, e.g., the grooves 43a of piece 31, are aligned with the corresponding grooves, e.g., the grooves 43a of the other piece 33 when the net 10 is unfolded and the frame members 15, 17 are generally coincident with the same plane 45.

The handle 39 has a third (and possibly fourth) surface deformation 47, e.g., one or, preferably, two ridges 47a, along most of its length. When the net 10 is unfolded and the grooves 43a aligned (as described above), the handle ridges 47a engage the corresponding grooves 43a in both lock pieces 31, 33 and prevent such pieces 31, 33 from rotating with respect to one another and with respect to the handle 39.

The outward end 49 of the handle 39 has a substantially cylindrical release portion 51 which is free of ridges 47a or other surface deformation 47 used to lock the pieces 31, 33 as described. When the handle 39 is pushed inward toward the net distal portion 11, the release portion 51 becomes aligned with that lock piece 31 or 33 nearest the grip member 53. (In the embodiment of FIG. 4, the release portion 51 would be aligned with lock piece 33. In the embodiment of FIGS. 1 and 2, the release portion would be aligned with lock piece 31a.)

Such lock piece 31 or 33 is thereby no longer prevented by the handle ridges 47a from rotating with respect to the handle 39. For net folding (and considering the embodiment of FIG. 4), the lock piece 33 and the attached frame member 25 may be rotated with respect to the handle 39 and the lock piece 31. To put it another way, in such embodiment, the lock piece 31 and the handle 39 are non-rotatable with respect to one another since the grooves 43a of piece 31 are always engaged with the ridges 47a of the handle 39. However, the handle 39 can slide in the lock piece 31. (The release portion 10 is preferably at the handle outward end 49 so that when the net 10 is folded, the handle 39 does not obstructively "stick out" away from the net frame members 15, 17. Space is thereby saved when the net 10 is folded.)

It is to be appreciated that the embodiment of FIGS. 1 and 2 includes lock pieces 31a, 33a configured so that the ring portion 55 of lock piece 31a is nearer the grip member 53 than is the ring portion 57 of lock piece 33a. Thus, ring portion 55 turns with respect to the handle 39 but portion 57 does not. On the other hand, in the embodiment of FIG. 4, lock pieces 31, 33 are configured so that the ring portion 57 of lock piece 33 is nearer the grip member 53 than is the ring portion 55 of lock piece 31. Thus, ring portion 57 turns with respect to the handle 39 but portion 55 does not. The net 10 can be made either way.

It is also to be appreciated that the "groove-and-ridge" arrangement shown in FIGS. 1, 2 and 4 is but one possible embodiment. Rather than having ridges 47a, the handle 39 may have any one of several "key-like" cross-sectional shapes, i.e., shapes that function like a shaft key in preventing relative rotation of two parts. For example, square, hexagon, oval or splined as shown in FIGS. 8, 9, 10 and 11, respectively, are but a few examples of handle cross-sectional shapes that could be used. This is so since any of such shapes, when used with lock pieces having conformably-shaped openings 59, prevent relative rotating movement of the handle 39 and the lock pieces 31, 33 with respect to one another. (When considering the foregoing, it is to be appreciated that whatever cross-sectional shape is used, the release portion 51 of the handle 39 is preferably circular in cross-section.)

Referring again to FIGS. 4, 5, 6 and 7, the first lock piece 31 includes a stop member 61 and the second lock piece 33 includes a stop surface 63 in contact with the stop member 61 when the net 10 is erected for use. In a highly preferred embodiment, each lock piece 31, 33 has a stop member 61 and a stop surface 63. When the net 10 is unfolded ready for use, the stop member 61 of the first lock piece 31 contacts the stop surface 63 of the second lock piece 33. Similarly, the stop member 61 of the second lock piece 33 contacts the stop surface 63 of the first lock piece 31. The stop members 61 and surfaces 63 are arranged in a way that when such stop surfaces 63 contact their respective stop members 61, the grooves 43a or other surface deformations 43 in the lock pieces 31, 33 are aligned with one another so that the handle can slide in such lock pieces 31, 33 for net folding or setup.

And there are yet additional new features. The lock pieces 31, 33 are configured so that they are relatively axially immovable one with respect to the other. To that end, at least one lock piece e.g., piece 31, has a circumferentially-extending land 65 engaging a notch 67 in the other lock piece 33. Most preferably, each lock piece 31, 33 has such a land 65 and notch 67.

In a preferred embodiment, the handle 39 and the lock pieces 31, 33 retentively engage one another so that whether folded for storage or travel or unfolded for use, the handle 39 does not separate from the other components of the net 10 and, particularly, from the lock pieces 31, 33. To that end, the handle 39 has a disc-like shoulder 69 at its inward end for engaging the proximal portion 13 of the net, i.e., one of the two lock pieces 31, 33, thereby preventing the handle 39 from separating from such proximal portion 13 while the net 10 is in use.

And, most preferably, there is a second shoulder 71 at the outward end which engages such proximal portion 13 when the handle 39 is telescoped inward and the net 10 is folded or ready to be folded. Such second shoulder 71 prevents the handle 39 from separating from such proximal portion 13 when the net 10 is folded.

Figure 12:
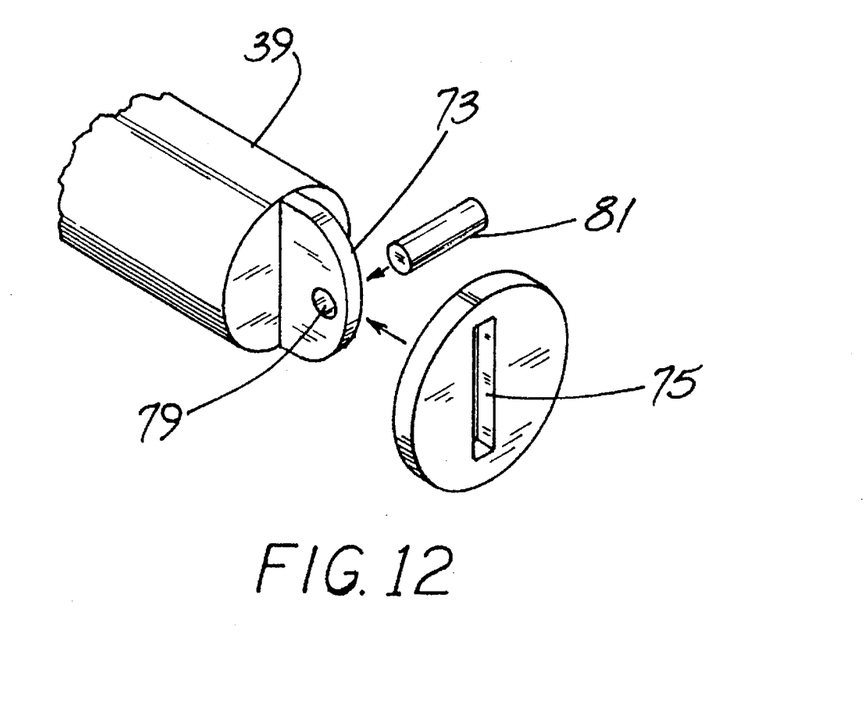
FIG. 12 is a perspective view of the outward end of the handle showing a retained disassembly disc.

Referring next to FIG. 12, for ease of assembly and disassembly (if needed to replace a part, for example), it is preferred that the handle 39 and the lock pieces 31, 33 be separable from one another. To permit such separation, that end of the handle 39 which receives the grip member 53 includes an axially protruding tongue 73 which extends through a slot 75 in the disassembly disc 77. The tongue has a hole 79 for receiving a holding pin 81 (much like a cotter key) to hold the disc 77 on the handle 39.

Figure 13:
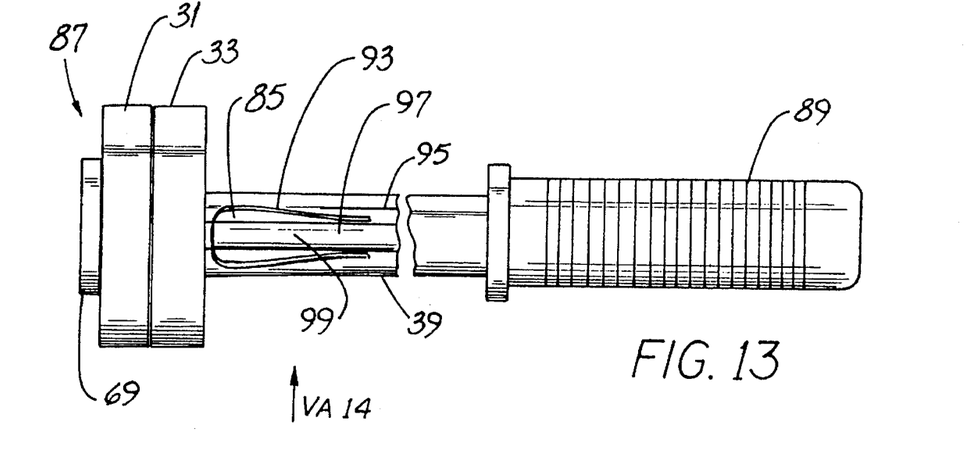
FIG. 13 is a top elevation view of a portion of the new net showing one embodiment of a locking member.
Figure 14:
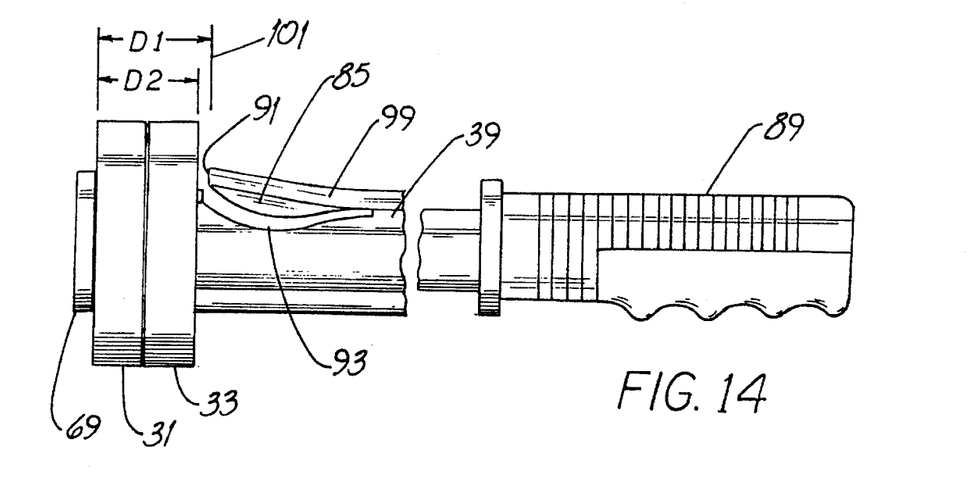
FIG. 14 is a side elevation view of a portion of the new net taken along the viewing axis VA14 of FIG. 13.

Referring next to FIGS. 13 and 14, another embodiment of the net 10 includes a locking member 85 between the handle distal and proximal ends and 87, 89, respectively, to prevent movement of the handle 39 along the long handle axis 41 toward the net distal portion 11 when the net 10 is erected for use. In a more specific embodiment, the locking member 85 engages one of the locking pieces 31 or 33 described above and prevents the handle 39 from collapsing toward such net distal portion 11.

The distance D1 between the shoulder 69 and the ledge-like abutment face 91 of the member 85 is only slightly greater than the distance D2 between the shoulder 69 and that locking piece 31 or 33 which is adjacent to the member 85. In that way, the handle 39 must be substantially fully extended before the member 85 pops outwardly to engage the locking piece 31 or 33 and very little handle movement is permitted subsequent to erecting the net 10 for use.

The locking member 85 can take any of several different embodiments. In a highly preferred embodiment (appropriate when the handle 39 is made of or at least includes a plastic material having shape memory), a generally U-shaped separating notch 93 is cut along the parent material 95 of the handle 39 to form the locking member 85. In that way, both the handle 39 and the locking member 85 include such material 95. The locking member 85 naturally biases itself outward to a lock position as shown in FIG. 14 where its abutment face 91 contacts or can contact one of the locking pieces 31, 33. The member 85 must be manually depressed to "clear" the locking pieces 31, 33 and refold the net 10.

When so formed, the parent material 95 of the handle and the material of the locking member 85 is a continuum 97. That is, there is no discontinuity or joint between such member 85 and the handle 39. A highly preferred plastic material for making the handle 39 and locking member 85 is chlorinated vinyl chloride (CVC).

Figure 15:
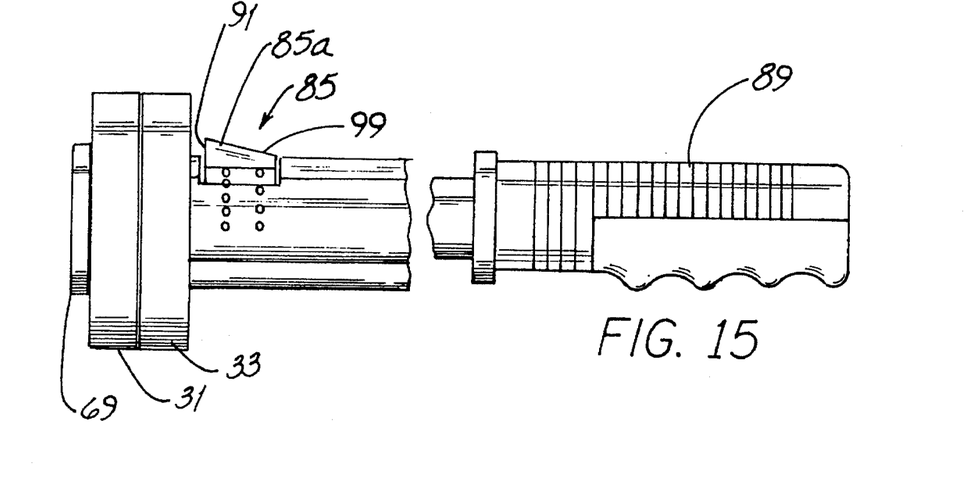
FIG. 15 is a side elevation view of a portion of the new net showing another embodiment of a locking member.

Referring next to FIG. 15, another embodiment of the locking member 85 includes a spring-biased button 85a that has a positive-lock abutment face 91. Such button 85a "pops out" when the handle 39 is moved to its fully-extended position.

In either embodiment, it is preferred that the locking member 85 include a gradually sloping camming surface 99. As the handle 39 is withdrawn to the "use" position, i.e., away from the net distal portion 11, such surface 99 contacts the locking pieces 31, 33 and automatically cams the locking member 85 toward the handle 39 for full handle withdrawal.

After the locking member 85 "clears" the locking pieces 31, 33, such member 85 moves radially outward away from the handle axis 41. Such outward movement of the member 85 prevents subsequent handle movement toward the net distal portion 11 until the member 85 is manually depressed.

It is also preferred that the locking member abutment face 91 be generally normal to the handle axis 41, i.e., generally parallel to a plane 101 perpendicular to such axis 41. In that way, there is no tendency of a locking piece 31, 33 to cam the member 85 inward as is the case with a rounded button or the like.

While the principles of the invention have been described in connection with a few specific embodiments, it is to be understood clearly that such embodiments are by way of example and are not limiting.

What is claimed is:

1. In a fish landing net including (a) a distal portion, (b) a proximal portion and (c) a handle at the proximal portion and extending along an axis, the improvement wherein:

the net includes first and second lock pieces and each lock piece substantially circumscribes the axis;

the handle is mounted for movement along the axis between an extended position and a telescoped position; and one of the lock pieces is rotatable about the axis and with respect to the handle when the handle is at the telescoped position.

2. The net of claim 1 wherein:

the handle is supported by the lock pieces for telescoping movement.

3. The net of claim 2 wherein:

the first and second lock pieces includes first and second surface deformations, respectively;

the handle includes a third surface deformation; and when the net is erected for use, the third surface deformation engages the first and second surface deformations, whereby relative movement of the handle and the lock pieces with respect to one another is substantially prevented.

4. The net of claim 3 wherein:

the third surface deformation extends axially on the handle;

the handle has an outward end away from the net distal portion;

the outward end includes a release portion free of the third surface deformation, whereby the lock pieces and the handle can be relatively pivoted when the lock pieces and the release portion are coincident with one another.

5. The net of claim 3 wherein:

the first and second surface deformations comprise grooves in the first and second lock pieces, respectively; and the third surface deformation comprises a ridge on the handle.

6. The net of claim 4 wherein:

the first and second surface deformations comprise grooves in the first and second lock pieces, respectively; and the third surface deformation comprises a ridge on the handle.

7. The net of claim 3 wherein:

the first lock piece includes a stop member; and the second lock piece includes a stop surface in contact with the stop member when the net is erected for use.

8. The net of claim 7 wherein:

the stop member is a first stop member;

the second lock piece includes a second stop member; and the first lock piece includes a stop surface in contact with the second stop member when the net is erected for use.

9. The net of claim 8 wherein each lock piece has a land engaging a groove in the other lock piece.

10. The net of claim 1 wherein:

the net includes a pair of frame members; and the frame members are joined at the distal portion by an elastomer connector.

11. The net of claim 1 wherein:

the handle has a distal end and a proximal end;

a locking member is between the ends and prevents movement along the axis when the handle is at the extended position; and the locking member engages one of the lock pieces, thereby preventing movement along the axis.

12. The net of claim 11 wherein:

the handle is made of a plastic material having shape memory; and the locking member is formed by cutting the plastic material.

13. The net of claim 12 wherein the handle and the locking member comprise a continuum of the plastic material.

14. The net of claim 11 wherein the locking member includes a spring-biased button.

15. In a fish landing net including (a) a distal portion, (b) a proximal portion and (c) a handle at the proximal portion, the improvement wherein:

the handle is mounted for movement along an axis extending between the proximal and distal portions;

the proximal portion includes first and second lock pieces supporting the handle for telescoping handle movement;

the first and second lock pieces includes first and second surface deformations, respectively;

the handle includes a third surface deformation; and when the net is erected for use, the third surface deformation engages the first and second surface deformations, thereby substantially preventing relative movement of the handle and the lock pieces.

16. The net of claim 15 wherein:

the third surface deformation extends axially on the handle;

the handle has an outward end away from the net distal portion;

the outward end includes a release portion free of the third surface deformation, whereby the first lock piece and the handle can be relatively pivoted when the first lock piece and the release portion are coincident with one another.

17. The net of claim 16 wherein:

the first and second surface deformations comprise grooves in the first and second lock pieces, respectively; and the third surface deformation comprises a ridge on the handle.

18. The net of claim 15 wherein:

the first lock piece includes a stop member; and the second lock piece includes a stop surface in contact with the stop member when the net is erected for use.

19. The net of claim 15 including a locking member for preventing handle movement along the axis when the net is erected for use and wherein the handle and the locking member comprise a continuum of plastic material.

* * * * *